(No Model.) 2 Sheets—Sheet 1.

B. J. CURRY.
COTTON CHOPPER.

No. 260,458. Patented July 4, 1882.

Attest:
H. H. Schott
A. R. Brown

Inventor:
Burwell J. Curry
by H. C. Tasker atty (No Model.) 2 Sheets—Sheet 2.
B. J. CURRY.
COTTON CHOPPER.
No. 260,458. Patented July 4, 1882.
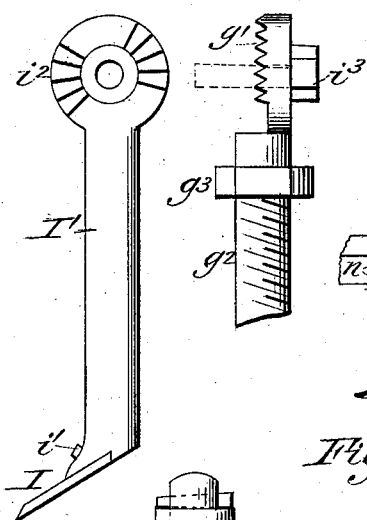
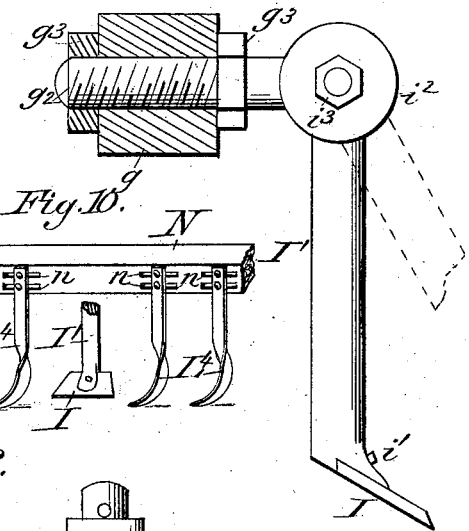
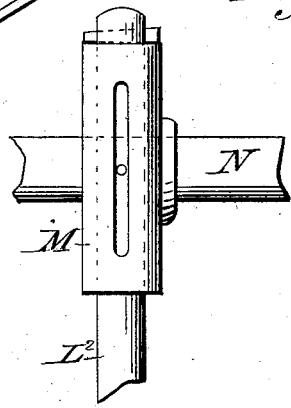
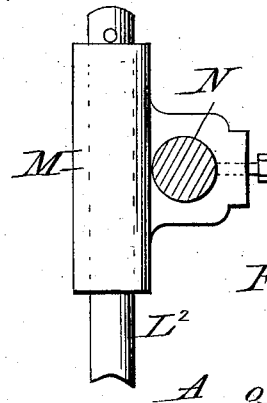
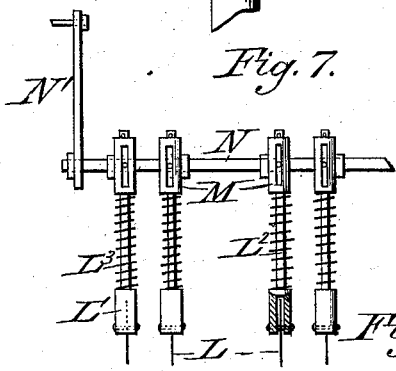
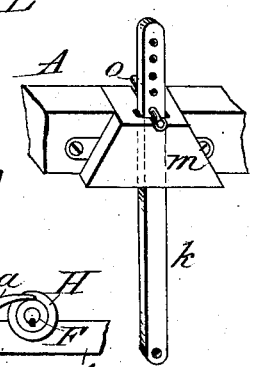
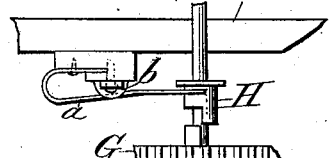
Attest:
F. H. Schott
A. R. Brown.
Inventor,
Burwell J. Curry

UNITED STATES PATENT OFFICE.

BURWELL J. CURRY, OF HUNTSVILLE, ALABAMA.

COTTON-CHOPPER.

SPECIFICATION forming part of Letters Patent No. 260,458, dated July 4, 1882.

Application filed April 21, 1882. (No model.)

*To all whom it may concern:*

Be it known that I, BURWELL J. CURRY, a citizen of the United States, residing at Huntsville, in the county of Madison and State of Alabama, have invented certain new and useful Improvements in Cotton-Choppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of agricultural machines known as "cotton-choppers," the object being to perfect and simplify the construction of the same.

The machine consists of a frame which supports a series of longitudinally-vibrating hoes or choppers and their actuating mechanism, in front of which is arranged a movable shaft, to which are connected a series of self-adjusting rotary cutters, that are adapted to cut the soil vertically in advance of the side edges of the choppers, so that the standing crop will be relieved from any liability of injury from jar or concussion caused by the action of the choppers.

The invention consists in the construction and arrangement of devices, as will be hereinafter more fully described and claimed.

Figure 1:
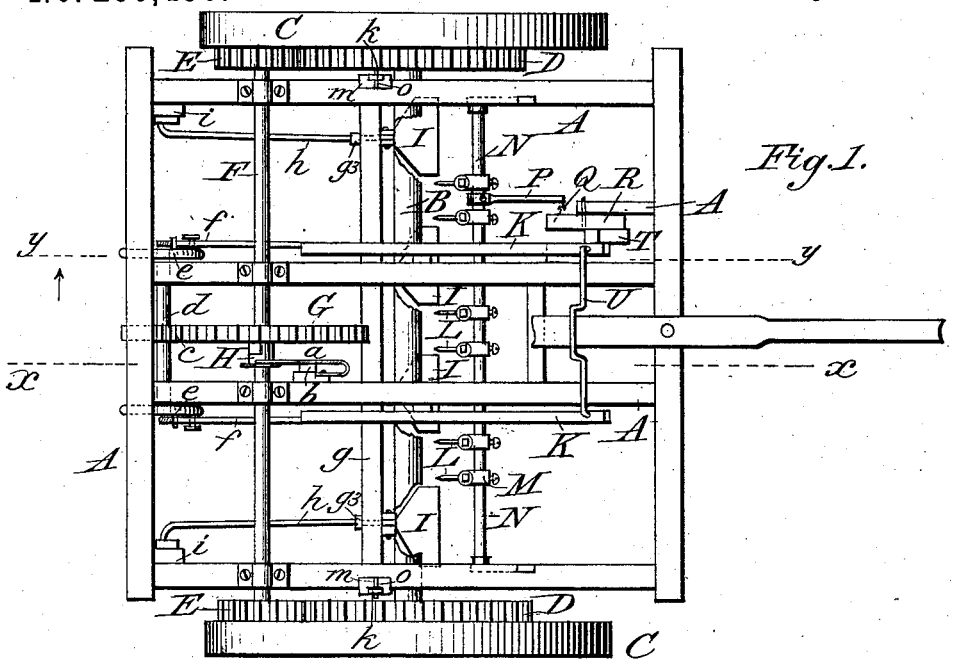
Figure 2:
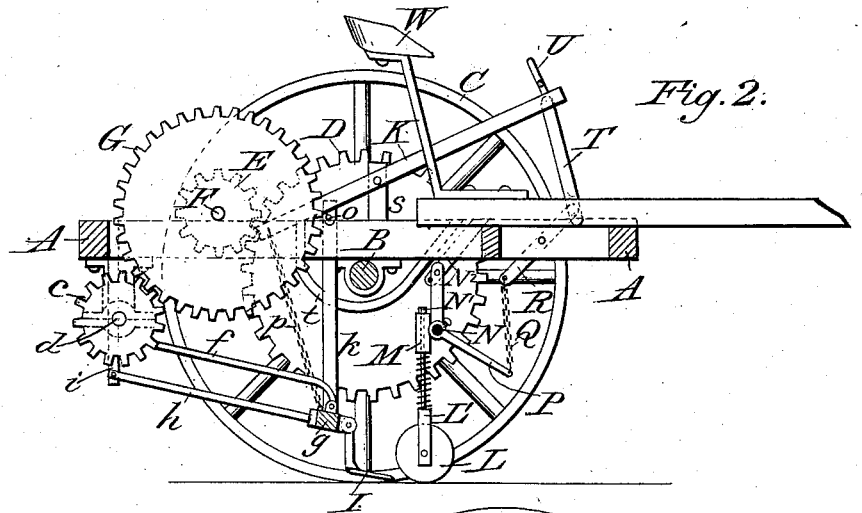
Figure 3:
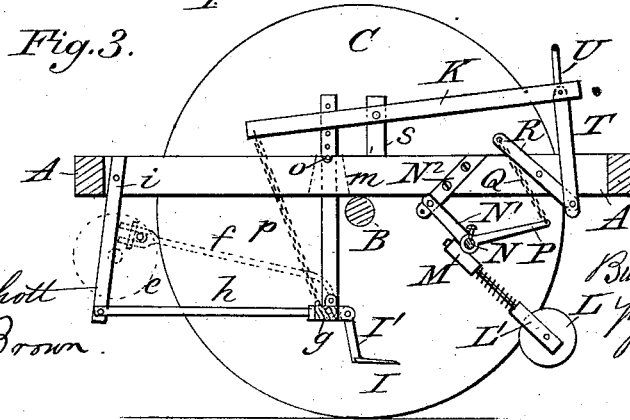

In the annexed drawings, illustrating the invention, Figure 1 is a plan or top view of my improved cotton-chopper. Fig. 2 is a longitudinal section on the line $x\ x$ of Fig. 1. Fig. 3 is a similar section on the line $y\ y$. Figs. 4 and 5 are details illustrating the manner of attaching and adjusting the hoes. Figs. 6 and 7 illustrate the construction and arrangement of the circular cutters and their connections. Fig. 8 is a detail view of one of the boxes attached to the frame of the machine and of the vertically adjustable lifting-bars by means of which the hoes are simultaneously raised. Fig. 9 illustrates the construction of the clutch mechanism by which the operative parts are thrown in and out of gear with the driving mechanism; and Fig. 10 is a modification, to be hereinafter described.

Like letters are used to designate the same parts throughout the several views.

The frame A is supported, in the usual manner, on an axle, B, having wheels C C. Within these wheels, and rigidly screwed to the axle on each side, are the large gears D D, which mesh with the small gears or pinions E E, that are placed one on each end of a shaft, F, that is journaled near the rear of the frame. This shaft F is provided centrally with a gear, G, which is mounted loosely on said shaft, but is adapted to revolve with it when in engagement with a clutch, H, that slides on a feather which is formed on said shaft.

The clutch H is connected with a lug on the frame A by means of a spring-arm, $a$, and to this lug is pivoted a lever, $b$, (see Fig. 9,) which has a semicircular conical end, that is adapted to force the spring-arm outward when the lever is moved, thus throwing the clutch-jaw H into engagement with a corresponding jaw on the gear-wheel G, as shown in Fig. 1. The gear-wheel G meshes with a pinion, $c$, that is fixed to a short shaft, $d$, which is journaled in suitable bearings at the rear end of the machine. The shaft $d$ is provided at each end with an eccentric, $e$, to each of which is attached a rod or pitman, $f$, that is connected with a transverse bar, $g$, to which the shanks of the hoes I are attached. The bar $g$, to which the hoe-shanks are attached, is connected at each end with a rod, $h$, that is pivoted at its rear end to a vertically-hanging bar, $i$, which is pivoted near the rear end of the machine. The transverse bar $g$ is supported by the vertically-adjustable bars $k\ k$, each of which passes through a box, $m$, secured to the side bars of the frame. The upper end of the bar $k$ is provided with a series of perforations, through one of which is passed a pin, $o$, that rests in a groove or bearing formed in the top of the box. By raising or lowering the bars $k\ k$, and inserting the pins $o$ into the apertures therein at a suitable point, it is evident that the hoes may be adjusted to operate at any desired depth.

It will be observed that the box $m$ is of such shape, its sides being inclined, as shown in Fig. 8, as will allow the bars $k$ to oscillate with the transverse bar $g$ in operating the hoes.

The vibrating bar $g$ is connected by chains $p$ with the rear ends of two levers, K K, which are fulcrumed to suitable supports, $s$, on the main frame, so that by depressing the forward ends of said levers the hoes will be simultaneously raised when desired.

The form of the hoes or choppers I, which are of the standard width, is shown in Fig. 1, and their manner of attachment is shown in Figs. 4 and 5. These hoes are secured to their shanks I' by means of bolts or rivets $i'$, so as to be readily removed for sharpening, or be replaced when broken, the heads or nuts, by which the bolts are held on the under side of the hoes, being countersunk therein.

The upper end of each shank I' is provided with a toothed or corrugated disk, $i^2$, that engages with a correspondingly-formed disk or lug, $g'$, which is formed on the end of a threaded bolt, $g^2$, that is passed horizontally through the transverse oscillating bar $g$ and is secured thereto by nuts and shoulders $g^3$, as shown in Fig. 5.

The corrugated disks $i^2$ and $g'$ are held to their engagement by means of a bolt and nut, $i^3$, in such a manner that by loosening said nuts the shanks I' may be moved so as to adjust the attached hoes to any desired angle.

The shanks of the end hoes, instead of being attached by means of the threaded bolts $g^2$, are preferably secured to the ends of the rods $h\ h$, Fig. 1, which rods are passed through the bar $g$ in the same manner as the bolts $g^2$, and may be provided at their ends with corrugated disks similar to the disks formed on the threaded bolts before referred to.

It will be seen that as the machine is drawn forward across the rows of plants the hoes or choppers I, connected with the vibrating transverse bar $g$, will be caused to reciprocate horizontally at any depth beneath the surface of the soil to which they may have been adjusted. The surplus plants are thus effectually cut and destroyed, while by means of the rotating cutters, that will be next described, the portion of the crop left standing will remain uninjured and in regular form throughout the field.

In front of the hoes or choppers, on each side of the spaces between the same, are arranged the circular cutters L L, the axes of which are journaled in tubular bearings L' L', which are provided with stems $L^2$. These stems are connected at their upper ends with tubular bosses M M, that are adjustably secured upon a transverse shaft, N, said bosses being each provided with a collar and set-screw, by means of which an adjustable connection is attained. The front of each tubular boss M is slotted longitudinally for the reception of a pin on the stem $L^2$, the end of which is inserted in said boss. These pins, in connection with the slots in which they are adapted to move, serve as guides for the stems in preventing them from turning in their up-and-down movement. Each stem $L^2$ is provided with a coiled spring, $L^3$, arranged between the ends of the tubular parts L' and M, said springs having sufficient tension to force the rotating cutters through the encrusted soil and yet permit them to rise and pass over obstructions without receiving injury therefrom.

At each end of the shaft N is an arm, N', which is pivoted at its opposite end to a bar, $N^2$, attached diagonally to one of the side pieces of the frame, as shown at Figs. 1 and 3. These bars $N^2$, on each side, are provided at their ends with pins or projections arranged to limit the backward movement of the arms N', by means of which the shaft N is supported, said shaft being thus adapted to move so as to bring the cutter-stems $L^2$ from a vertical position forward and upward, but not backward. The shaft N is moved or swung forward and upward for the purpose of raising the rotary cutters from the ground by means of a lever or arm, P, which is adjustably attached to the shaft by a set-screw, as shown in Figs. 1, 2, and 3, said lever being connected by a chain, Q, with a bar or lever, R, that is pivoted to the frame of the machine and connected by a rod or bar, T, with the forward end of one of the levers K. A similar mechanism may be connected with each lever K, if desired; but the shaft N can be readily raised, if connection is made with one of said levers only. These levers K K are connected at their forward ends by the stirrup or double-crank rod U, so that both of said levers may be readily operated at the same time by the pressure of the driver's feet. The forward ends of the levers K K being depressed, it is evident that the rotary cutters will be elevated and thrown forward through the action of the connecting-rod T in forcing the forward end of the lever R downward, the rear end of said lever R drawing up the forward end of the lever P through its connection therewith by the chain Q. In depressing the forward ends of the levers K K, the upward movement of their rear ends, by drawing upon the chains $p\ p$, necessarily raises the transverse bar $g$, to which the choppers I are attached. It will thus be seen that the choppers and rotary cutters may be readily and instantaneously raised, when desired, either for the purpose of avoiding obstructions or when crossing from place to place. In raising the chopper-bar $g$, it is evident that the supporting-bars $k\ k$, pivoted thereto, will slide upward in their boxes $m\ m$, and when the pressure upon the levers is relaxed the said bars will descend until their supporting-pins $o\ o$ rest in their bearings in the top of the boxes. These bars $k\ k$ enable the chopper-bar $g$ to be acted upon by the eccentrics $e\ e$ and connecting-rods $f\ f$ in such a manner as to impart a positive and direct reciprocation to the choppers, the construction of the boxes $m\ m$ being such as will permit the bars $k$ to oscillate back and forth with the bar $g$, while all lateral oscillation is prevented by means of braces or guides $t\ t$, which are secured to each side of the frame exterior to the bars $k$, as shown in Fig. 2.

The seat W is placed at a convenient point, so that the driver, by a simple pressure of his feet upon the stirrup U, can readily operate the levers for raising the choppers and rotary cutters.

By means of the rotary cutters it will be seen that the soil is cut vertically in advance of the choppers, so that the action of said reciprocating choppers will not break the ground irregularly, thereby avoiding all liability of jar or concussion, which may be injurious to the portion of the crop that is left standing. The bosses, to which the stems of the cutters are attached, being capable of a lateral adjustment upon the shaft to which they are connected, it will be seen that by simply varying the width or number of choppers the crop to be acted upon may be thinned to any desired degree, according to the character and requirements of said crop, whether cotton, peas, beans, sorghum, or other like plants that are grown in a similar manner.

The advantage of constructing the rotary cutters in such a manner that they will be independently and self adjustable is apparent, as they are thereby protected from injury when brought in forcible contact with obstructions.

In Fig. 10 is shown a modified form of cutters that may be used instead of the rotary cutters L, before described. In this case the shaft or bar N is provided at suitable intervals with slots $n$, arranged in pairs, the knives or cutters $L^4$ being adjustably secured to the shaft or bar N by means of bolts, screws, or rivets passed through said slots. The knives or cutters $L^4$ may thus be adjusted laterally to any desired position, according to circumstances. These knives are made of spring-steel, and are formed with a twist, as shown in Fig. 10, so that while attached flatwise to the bar at their upper ends their cutting-edges will be presented in the proper direction to cut through the incrusted soil in a similar manner to the rotary cutters. The knives or cutters $L^4$ are particularly adapted for use in certain kinds of soil that are cloddy and filled with fine particles of decayed grass and weeds. Being formed of spring-steel, they will give readily when brought in contact with obstructions, thus obviating any liability to breakage.

Having thus described my invention, what I claim as new, and desire to secure by Letters Patent, is—

1. In a cotton-chopper, the combination, with the transverse vibrating bar $g$, of the threaded bolts $g^2$, secured therein and having corrugated disks $g'$, and the chopper-shanks $I'$, having corrugated disks $i^2$, adapted to engage with the disk ends of said bolts, whereby the hoes may be adjusted to any desired angle, substantially as described.

2. In a cotton-chopper, the combination, with the transverse shaft N, of the slotted tubular bosses M, adjustably secured thereon, the stems $L^2$, inserted loosely in said bosses and having pins engaging with the slots, spiral springs $L^3$, coiled on said stems, and the rotating cutters L L, journaled in boxes L' L' at the lower ends of the stems, whereby said cutters are adapted to operate with a yielding pressure, substantially as described.

3. In a cotton-chopper, the combination of the frame A, transverse vibrating bar $g$, choppers I, connected therewith, adjustable oscillating bars $k\ k$, levers $i\ i$, connecting-rods $h\ h$, pitmen $f\ f$, shaft $d$, having eccentrics $e\ e$ and central gear, $c$, and suitable operating mechanism, whereby the choppers are caused to vibrate longitudinally, substantially as described.

4. In a cotton-chopper, the combination, with the shaft N, having arms N' and P, and the rotating cutters L L, journaled in tubular bearings L', provided with stems $L^2$, having a yielding connection with said shaft, of means of imparting an upward and forward movement to said shaft N, for the purpose of raising the rotating cutters, substantially as described.

5. In a cotton-chopper, the combination, with the frame A and bars $N^2$, of the shaft N, having arms N' pivoted to said bars, the rotating cutters L, having a yielding connection with said shaft, and means for raising and lowering the same, substantially as described.

6. In a cotton-chopper, the combination, with the vibrating chopper-bar $g$, hoes I, connected therewith, adjustable supports $k\ k$, movable shaft N, having arms N' and P, and rotating cutters L L, of the levers K K, connected by stirrup U, chains $p\ p$, connecting the rear ends of said levers with the vibrating chopper-bar, and the connecting-rod T, lever R, and chain Q, connecting the forward end of one or both main levers with the arm attached to the cutter-shaft, whereby the choppers and cutters are simultaneously raised, substantially as described.

In testimony whereof I affix my signature in presence of two witnesses.

BURWELL J. CURRY.

Witnesses:
WILLIAM RIENARDUN,
W. R. RISON.